June 6, 1961 J. R. TSCHUDNOWSKY 2,987,173
MECHANICAL CONTROL FOR PARTS OF A DRAWING CARRIAGE
Filed Nov. 6, 1956 2 Sheets-Sheet 1
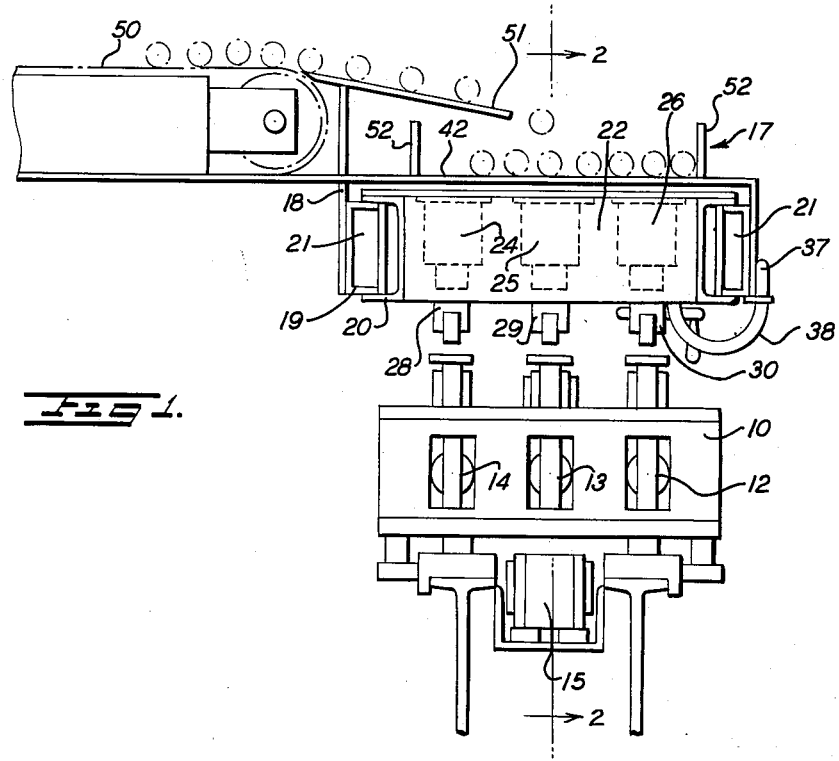
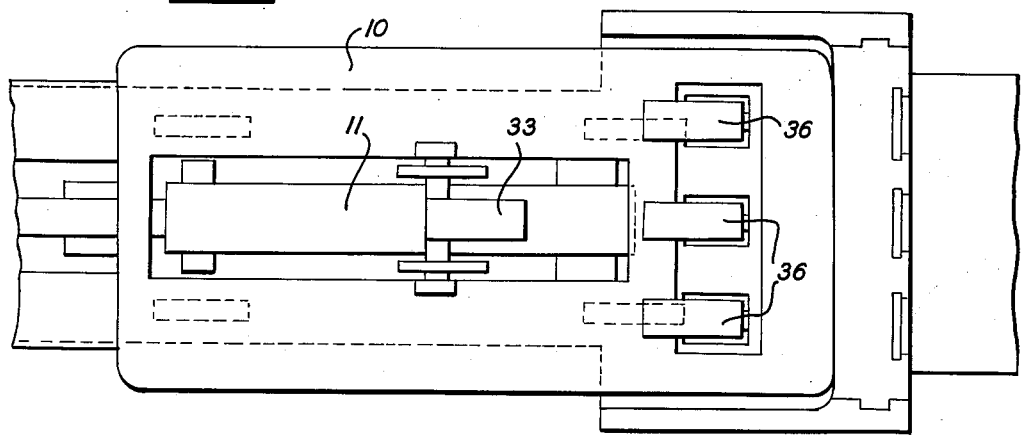
INVENTOR.
JEAN ROGER TSCHUDNOWSKY
BY Paul M. Craig, Jr.
ATTORNEY

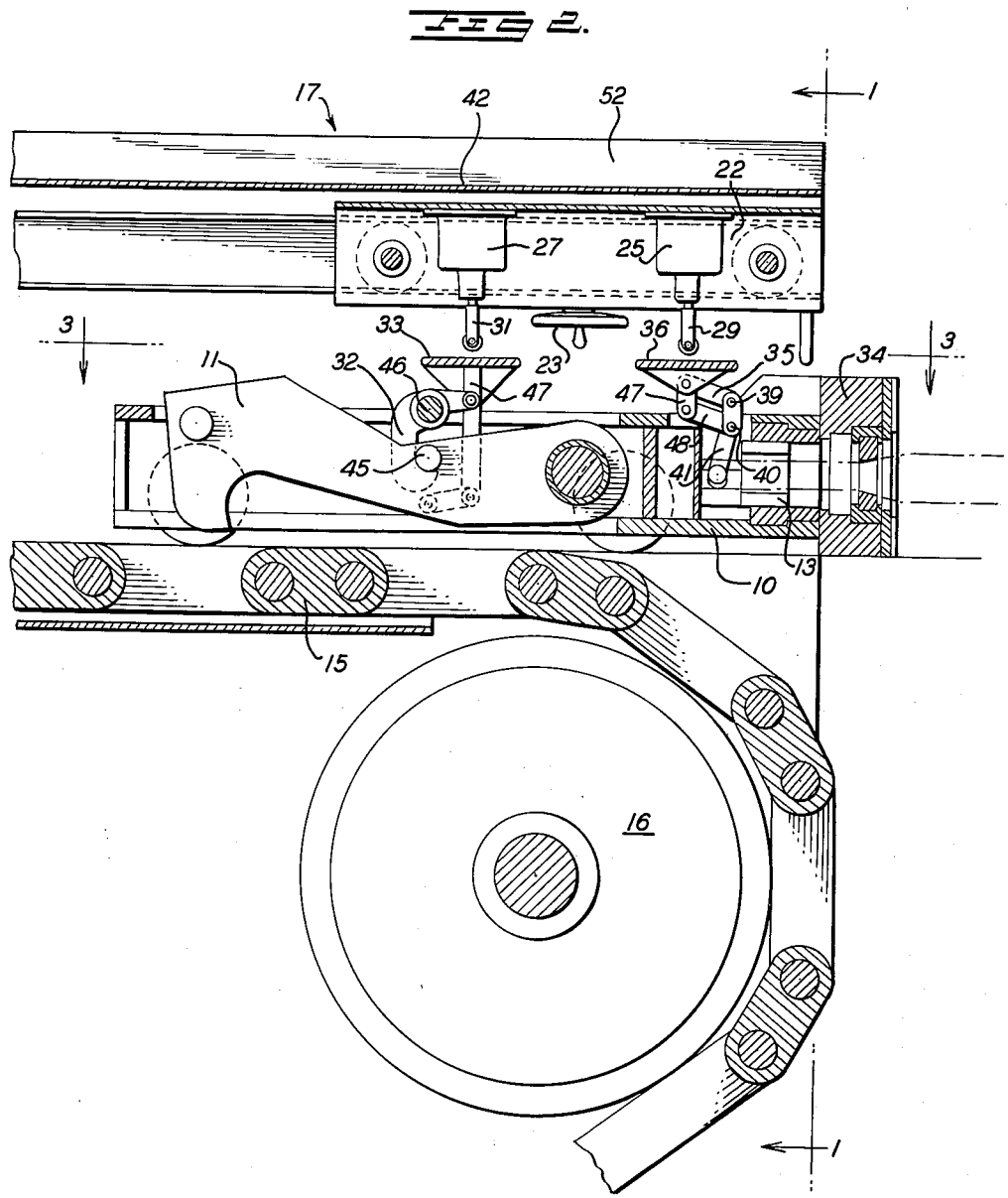

United States Patent Office 2,987,173
Patented June 6, 1961

2,987,173
MECHANICAL CONTROL FOR PARTS OF A
DRAWING CARRIAGE
Jean Roger Tschudnowsky, Paris, France, assignor to
Compagnie Generale du Duralumin et du Cuivre, Paris,
France, a corporation of France
Filed Nov. 6, 1956, Ser. No. 620,764
Claims priority, application France Dec. 1, 1955
3 Claims. (Cl. 205—22)

This invention relates to drawing benches for products such as tubes, bars and section elements. The principle of drawing is known to consist in passing the product through a drawing die, pulling it by means of a chuck or jaws. This chuck is attached to a carriage which is itself driven by an endless chain. It is possible, at will, to hook the carriage on to the chain or to unhook it therefrom. Operation, at the start, thus consists in:

(1) tightening the chuck on the product;
(2) hooking the carriage on to the chain.

When drawing is limited to one product at a time only, control is generally effected manually.

On multiple benches, however, drawing up to three or five products at a time, the effort required for tightening the chucks and hooking the carriage on to the chain becomes too large, particularly with products having large sections, to be practicable manually. A mechanical control is then used, and chiefly a compressed air control.

To that effect, the carriage is provided with a set of jacks acting on the chucks and on the tie-hook; the jacks are supplied with compressed air through a hollow plug provided on the carriage. When the latter reaches its return position the plug enters a trumpet shaped socket secured to the head of the bench and thus effects a connection with an outside compressed air duct.

These pneumatic servo-mechanisms are thus subjected to frequent shocks during the starting and stopping of the carriage and to constant vibration during operation; they are rapidly damaged. Further, sealing for the air take-off, the movable plug and fixed trumpet is difficult to accomplish and does not last.

The object of this invention is to obviate these drawbacks.

More specifically, its object is a mechanical control of the parts of a drawing carriage such as tie-hooks and clamping chucks, characterized by the provision of a second carriage upon which are mounted selectively operable control means for these parts which means may be of a pneumatic, hydraulic or electromagnetic character, the second carriage being movable in a path parallel to the drawing bench.

There is generally provided, above the drawing benches, a spout, which, in case tubular products are being drawn, is reserved for engaging the tubes of the batch following that being drawn. It is advantageous, in the spirit of the invention, to locate the track for the control carriage under the framework of that spout.

This second, control carriage has a locking system which makes it possible to immobilize it on its track at any point on its run, so that it withstands perfectly the reaction to the stresses it is transmitting.

In principle, further, during normal operation, the control carriage is fixed, its position being immediately above the drawing carriage at the return position of the latter against the die-holder at the time of actuation of clamping chucks 12, 13 and 14.

The control carriage is displaced only in case of a technical fault, i.e. breaking of a clutch or releasing of a chuck, power failure etc. Under such circumstances the control carriage is rolled and fixed directly above the point of failure in the carriage. It is then connected by its flexible hose to the nearest compressed air take-off along its path.

To give a clear idea of the invention to the reader of this specification, a non limitative example will now be described of an embodiment of the invention, with reference to the appended drawing wherein:

FIGURE 1 is an end view, at the level of the plane I—I in FIGURE 2, of a bench for the simultaneous drawing of three products, a bench equipped according to the invention.

FIGURE 2 is a view in section along the plane II—II in FIGURE 1; the drawing carriage is assumed in contact with the drawing dies and the section of the bench is limited substantially to the length of said carriage.

FIGURE 3 is a plan view of the drawing carriage on the bench.

As represented, particularly in FIGURE 2, the drawing carriage is designated by 10; the parts of this carriage are designated by 11 for the tie-hook and by 12, 13, 14 for the clamping chucks of the products to be drawn.

15 is the chain of the bench between the links of which the hook 11 is engaged when falling on the bench; 16 is the drum for the return of that chain; the driving drum (not shown) is at the other end of the bench.

FIGURE 1 shows means for delivering and storing the tubes preparatory to the drawing operation. These means include a conveyor 50, a ramp 51 and a spout or storage rack 17 comprising a platform 42 having confining rails 52. As indicated by dotted lines, the tubes are brought to the ramp in any desired number by the conveyer and after leaving the ramp are held between rails 52 on platform 42. The tubes may then be removed at will from the platform 42 in groups of three to a station at the right of FIGURE 2 for the drawing operation.

The inner framework 18 of this spout has been arranged, according to the invention, so as to receive two rails 19 and 20. These rails serve as rolling tracks and supporting means for the rollers 21 of the carriage 22 supporting the control system for the parts of the drawing carriage.

The carriage 22 is represented at its work position at the end of the framework 18 on which it is locked by means of the clamping handwheel 23. This carriage is equipped with four pneumatic control jacks 24, 25, 26 and 27; each jack can operate a movable element constituted by a push element, 28, 29, 30 and 31 respectively. These jacks are operable at the will of the operator and with their push elements constitute a selectively operable actuating means.

On its own part, the drawing carriage 10 is provided with a conventional device 32 such as a pivoted detent for locking the hook 11 in its lifted position by engagement with lug 45 carried by the hook; this device is supported on carriage 10 by pivot connection 46 and carries, at its upper portion, a releasing finger or plate member 33 which is just in register with the push element 31 when the carriage 10 is at the end of its return run, against the die holder 34, the members 32, 33, 45 and 46 constituting a control means for the hook. Similarly, the clamping of each pair of chucks (12, 13, 14) is ensured by a control means comprising a linkage arrangement. This linkage arrangement is illustrated in FIGURE 2 in connection with chuck 13. It is actuated by a finger or plate member 36 when the latter is engaged by push element 29. The linkage arrangement comprises a plunger 46 fast to the plate member and further comprises a link member 55 and a bell crank member having an arm 48 articulated to the plunger. These members are further articulated to the carriage 10 by fixed pivot means 39 and 40. The other arm 41 of the bell crank member is movable to the right as viewed in FIGURE 2 to engage chuck 13 to actuate the jaws thereof by appropriate means (not shown) to clamp the flattened end of the tube shown in dotted lines.

The jacks of the control carriage 22 are supplied with compressed air through the conduit 37 (FIGURE 1) lateral to the framework 18; each jack is connected with this conduit through a flexible hose such as 38, by a standard bayonet type joint, which ensures a great tightness and easy replacement should it be necessary.

When starting a drawing operation, it will be sufficient for the bench operator to depress a button, for instance, for causing, by an ejection of compressed air into the jacks, the projection of the push elements (28 to 31) and consequently the clamping of the chucks (12 to 14) on the products to be drawn engaged in the dies of the die holder 34 and the falling of the hook 11 on the chain 15.

Inasmuch as the control carriage 22 is protected against vibrations and shocks during the drawing operation and since it affords ample space for installing the equipment, standard jacks may be adopted, thus avoiding the constructional difficulties incident to a compact arrangement of the control elements necessitated by lack of space as in the case when the jacks are mounted on the drawing carriage itself. Such a compact arrangement might well dictate the employment of elements of inadequate structural strength.

As already pointed out above, it is possible, within the scope of the invention, to substitute hydraulically operated jacks to the pneumatic jacks, or even push elements with an electromagnetic control or the like.

The invention is applicable regardless of the number of products to be drawn in any one batch.

What is claimed is:

1. For a drawing bench comprising a driving chain and a drawing carriage provided with chuck means and with a hook adapted to engage a link of said chain, said drawing carriage further including a first individual control means mechanically connected to said hook and a second individual control means mechanically connected to said chuck means for control thereof, said first individual control means comprising a first movable member, said second individual control means comprising a second movable member; a control carriage disposed adjacent said bench and movable relatively thereto, supporting means for said control carriage defining a path of movement for said control carriage adjacent and parallel to the path of said drawing carriage, first selectively actuated means supported on said control carriage comprising means adapted for first engagement with said first movable member upon actuation of said first selectively actuated means, second selectively actuated means supported on said control carriage comprising means adapted for second engagement with said second movable member upon actuation of said second selectively actuated means, said control carriage being movable along said path of movement to a position in which said first and second selectively actuated means are disposed respectively in positions in which said means adapted for said first engagement and said means adapted for said second engagement are disposed respectively above and adjacent to said first and second movable members in positions enabling the effectuation of said first and second engagement.

2. For a drawing bench comprising a driving chain and a drawing carriage including chuck means and control means for said chuck means, said drawing carriage further including a hook adapted to engage a link of said chain and control means for releasably holding said hook in disengaged position, said first-named and said second-named control means each comprising a mechanical linkage and a plate member operatively connected thereto, each said plate member having an engageable surface parallel to the path of movement of said drawing carriage; a control carriage, means for supporting said control carriage for movement along a path parallel and adjacent to the path of movement of said drawing carriage, said control carriage comprising actuating means for said first-named control means and for said second-named control means, said actuating means comprising selectively operated pneumatic jacks having push elements each respectively adapted for engagement with a respective one said engageable surface, said control carriage being movable into a position in which each of said engageable plates is in register with one of said push elements.

3. For a drawing bench according to claim 1, said means adapted for first engagement with said first movable member comprising a movable element, and said means adapted for second engagement with said second movable member comprising a further movable element.

References Cited in the file of this patent

UNITED STATES PATENTS

| | | |
|---|---|---|
| 2,301,674 | Andrews | Nov. 12, 1942 |
| 2,399,745 | Kerr | May 7, 1946 |
| 2,679,925 | McIlvried | June 1, 1954 |

FOREIGN PATENTS

| | | |
|---|---|---|
| 572,429 | Great Britain | Oct. 8, 1945 |